(12) United States Patent
Moriie et al.

(10) Patent No.: US 10,771,840 B2
(45) Date of Patent: Sep. 8, 2020

(54) SINK DEVICE

(71) Applicant: Panasonic Intellectual Property Management Co., Ltd., Osaka (JP)

(72) Inventors: Yoshihiro Moriie, Osaka (JP); Akihiro Fuke, Osaka (JP); Kazuki Adachi, Osaka (JP); Hiroaki Nakayama, Osaka (JP); Takuma Adachi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 83 days.

(21) Appl. No.: 15/543,587

(22) PCT Filed: Feb. 25, 2016

(86) PCT No.: PCT/JP2016/000994
§ 371 (c)(1),
(2) Date: Jul. 14, 2017

(87) PCT Pub. No.: WO2016/136257
PCT Pub. Date: Sep. 1, 2016

(65) Prior Publication Data
US 2017/0353759 A1    Dec. 7, 2017

(30) Foreign Application Priority Data

Feb. 25, 2015  (JP) .................................. 2015-035765

(51) Int. Cl.
*H04N 21/436*   (2011.01)
*H04N 21/439*   (2011.01)
(Continued)

(52) U.S. Cl.
CPC . *H04N 21/43615* (2013.01); *H04N 21/21825* (2013.01); *H04N 21/436* (2013.01);
(Continued)

(58) Field of Classification Search
CPC ............................................... H04N 21/43615
See application file for complete search history.

(56) References Cited

U.S. PATENT DOCUMENTS

2007/0280646 A1* 12/2007  Seita ...................... H04N 5/781
                                                                    386/231
2009/0060455 A1    3/2009  Pan et al.
(Continued)

FOREIGN PATENT DOCUMENTS

JP          2012-165131         8/2012

OTHER PUBLICATIONS

International Search Report of PCT application No. PCT/JP2016/000994 dated May 10, 2016.
(Continued)

*Primary Examiner* — Jefferey F Harold
*Assistant Examiner* — Justin B Sanders
(74) *Attorney, Agent, or Firm* — McDermott Will & Emery LLP (57) ABSTRACT

A sink device is bi-directionally communicably connected to the source device. The sink device includes a first memory, and a controller. Stored in the first memory is a plurality of pieces of audio format information including information representing an audio format that the sink device can process. The controller selects, from among the plurality of pieces of audio format information stored in the first memory, one piece of audio format information corresponding to receiver format information representing an audio format that a receiver device connected to the sink device can process. The controller then outputs the selected audio format information to the source device.

5 Claims, 8 Drawing Sheets

(51) Int. Cl.
*H04N 21/45* (2011.01)
*H04N 21/218* (2011.01)
*H04N 21/4363* (2011.01)
H04N 5/775 (2006.01)
H04N 7/16 (2011.01)

(52) U.S. Cl.
CPC ..... *H04N 21/439* (2013.01); *H04N 21/43635* (2013.01); *H04N 21/4516* (2013.01); *H04N 5/775* (2013.01); *H04N 7/163* (2013.01)

(56) References Cited

U.S. PATENT DOCUMENTS

| | | | |
|---|---|---|---|
| 2010/0141845 A1 | 6/2010 | Kikkawa et al. | |
| 2011/0052141 A1* | 3/2011 | Takatsuji | H04N 5/775 386/231 |
| 2012/0136612 A1* | 5/2012 | Vanderhoff | H04N 5/765 702/119 |
| 2015/0100143 A1* | 4/2015 | Gao | H04L 65/4076 700/94 |

OTHER PUBLICATIONS

The Extended European Search Report dated Oct. 10, 2017 for the related European Patent Application No. 16755007.8.
Communication pursuant to Article 94(3) EPC dated Jul. 12, 2018 for the related European Patent Application No. 16755007.8.

* cited by examiner

SINK DEVICE

This application is a U.S. national stage application of the PCT International Application No. PCT/JP2016/000994 filed on Feb. 25, 2016, which claims the benefit of foreign priority of Japanese patent application 2015-035765 filed on Feb. 25, 2015, the contents all of which are incorporated herein by reference.

TECHNICAL FIELD

The present disclosure relates to a sink device communicably connected to a source device and a receiver device.

BACKGROUND ART

PTL 1 discloses a television receiver (hereinafter referred to as a "sink device"). In this sink device, when an Audio Visual (AV) amplifier (hereinafter referred to as a "receiver device") is connected, via a High-Definition Multimedia Interface (HDMI) (registered trademark), to the sink device, Extended Display Identification Data (EDID) of the sink device can be overwritten to EDID corresponding to audio that the receiver device can output. For example, when a receiver device outputs higher quality audio than audio output by the sink device, and the like, the sink device can output audio from the receiver device.

CITATION LIST

Patent Literature

PTL 1: Unexamined Japanese Patent Publication No. 2012-165131

SUMMARY

In a conventional technology, when a receiver device is not supporting a command of HDMI Consumer Electronics Control (HDMI CEC), i.e., "Request short audio descriptor," a sink device has difficulty in allowing a source device that is a source that outputs an audio signal to obtain appropriate audio format information such as EDID. In other words, even when a receiver device has received from a sink device a request for sending information on an audio format that the receiver device is supporting (a request of transmission from the receiver device to the sink device), if the receiver device does not have a function for sending to the sink device audio format information in accordance with the request, the sink device has difficulty in obtaining from the receiver device appropriate audio format information. The sink device therefore has difficulty in allowing the source device to obtain appropriate audio format information.

The present disclosure provides a sink device capable of allowing a source device to obtain appropriate audio format information.

The sink device according to the present disclosure is a sink device bi-directionally communicably connected to a source device. The sink device includes a first memory, and a controller. Stored in the first memory is a plurality of pieces of audio format information including information representing an audio format that the sink device can process. The controller selects, from among the plurality of pieces of audio format information stored in the first memory, one piece of audio format information corresponding to receiver format information representing an audio format that a receiver device connected to the sink device can process, and outputs the selected audio format information to the source device.

The sink device according to the present disclosure is capable of allowing a source device to obtain appropriate EDID.

DESCRIPTION OF EMBODIMENTS

Exemplary embodiments will be described below in detail with reference to the drawings as required. However, detailed descriptions more than necessary may be omitted. For example, a detailed description of an already well known matter and a duplicate description for substantially the same configuration may be omitted. This is to avoid the description below is unnecessarily redundant, and to facilitate understanding of those skilled in the art.

Incidentally, accompanying drawings and the description below are provided so that those skilled in the art sufficiently understand the present disclosure, and are not intended to limit the claimed subject matter.

The drawings are merely schematic drawings, and are not always intended for detailed illustration. In the drawings, substantially identical components are denoted by identical reference marks, and duplicated descriptions may be omitted or simplified.

First Exemplary Embodiment

A first exemplary embodiment will be described below with reference to FIGS. 1 to 7.

[1-1. Configuration]

Figure 1:
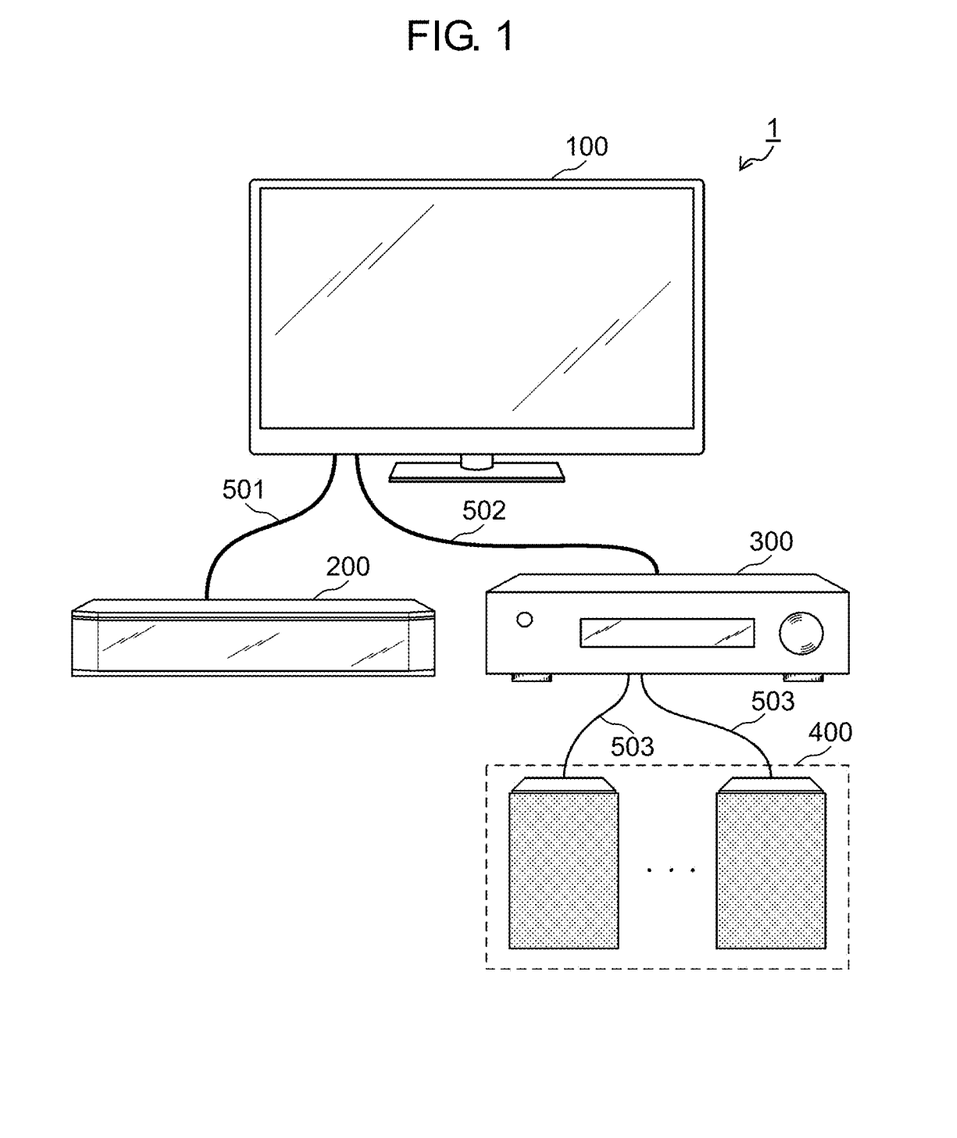
FIG. 1 is a view schematically illustrating an example of an appearance of an AV system according to a first exemplary embodiment.

FIG. 1 is a view schematically illustrating an example of an appearance of AV system 1 according to the first exemplary embodiment.

Figure 2:
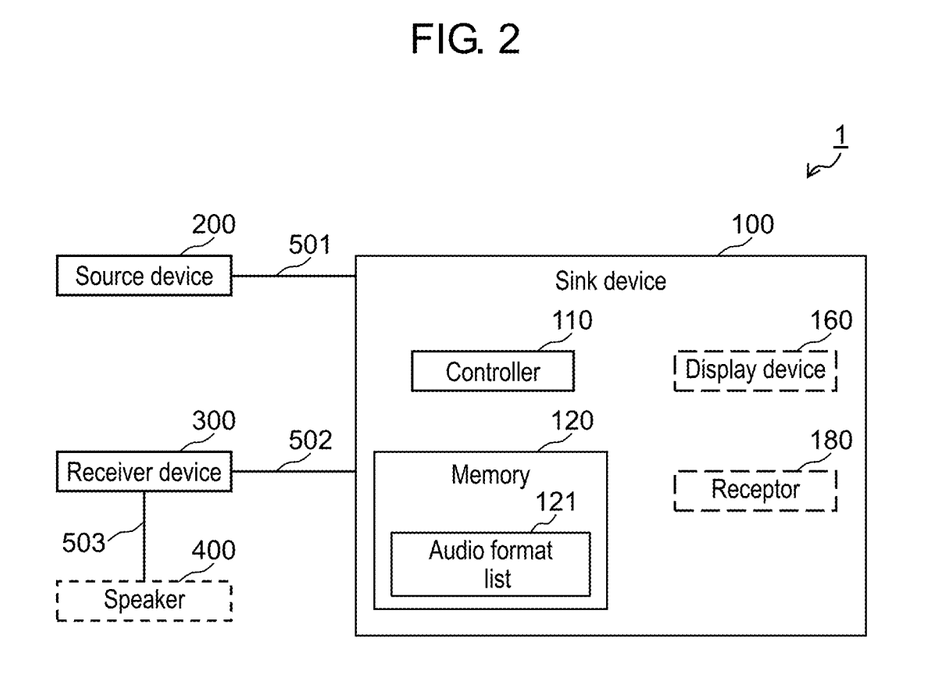
FIG. 2 is a block diagram schematically illustrating an exemplary configuration of the AV system according to the first exemplary embodiment.

FIG. 2 is a block diagram schematically illustrating an exemplary configuration of AV system 1 according to the first exemplary embodiment.

As shown in FIGS. 1 and 2, AV system 1 is configured to include sink device 100, source device 200, receiver device 300, and speaker 400.

Source device 200 is a device capable of outputting, in one of a plurality of formats, either or both of an audio signal (audio data) and an image signal (image data) obtained from, for example, a recording medium such as an optical disk, a magnetic disk, and a semiconductor memory, a communication network, or a broadcasting signal. Source device 200 has a function capable of outputting in a format based on format information obtained from sink device 100 either or both of an audio signal and an image signal. Source device 200 is, for example, a music reproducing device or a hard disk recorder and the like, but source device 200 may also be other devices.

Sink device 100 and source device 200 are connected to each other via HDMI cable 501, while sink device 100 and receiver device 300 are connected each other via HDMI cable 502. Receiver device 300 and speaker 400 are connected to each other via speaker cable 503 so that receiver device 300 can output the entered audio through speaker 400.

Sink device 100 includes, as shown in FIG. 2, controller 110, and memory 120. Sink device 100 may further include display device 160, and receptor 180. Sink device 100 is achieved by, for example, a television receiver or a monitor having a speaker for audio output.

Controller 110 can select, from among a plurality of pieces of audio format information described later stored in memory 120, one piece of audio format information corresponding to receiver format information. Note that receiver format information refers to information representing an audio format that receiver device 300 connected to sink device 100 can process. Controller 110 can then output through HDMI cable 501 and allow source device 200 to obtain the selected audio format information.

Controller 110 can also request receiver device 300 to send receiver format information.

Controller 110 may perform a first selection, after requesting receiver device 300 to send receiver format information (transmission from receiver device 300 to sink device 100), and then obtaining from receiver device 300 receiver format information. A first selection refers to an operation for selecting, from among a plurality of pieces of audio format information stored in memory 120, audio format information corresponding to obtained receiver format information.

Controller 110 may perform a second selection if receiver format information cannot be obtained from receiver device 300. A second selection refers to an operation for selecting, from among the plurality of pieces of audio format information stored in memory 120, audio format information corresponding to one piece of corresponding information selected through a user input accepted by receptor 180 described later. In this exemplary embodiment, receiver format information may include not only audio format information obtained from receiver device 300, but also audio format information selected through a user input.

Controller 110 can output, when a request for obtaining audio format information representing an audio format with which source device 200 should perform an output (a request of acquisition by source device 200 from sink device 100) is received from source device 200, audio format information stored in the second memory via HDMI cable 501, and can allow source device 200 to obtain the audio format information.

Controller 110 is achieved by, for example, a processor, a memory in which a program is stored, and the like.

Stored in memory 120 is a plurality of pieces of audio format information including information representing an audio format that sink device 100 (audio format list 121) can process. Memory 120 is an example of the first memory. Memory 120 may be an example of the second memory for storing audio format information selected by controller 110. Memory 120 is achieved by, for example, a non-volatile memory.

An audio format that sink device 100 can process refers to an audio format that sink device 100 can decode. An audio format that receiver device 300 can process refers to an audio format that receiver device 300 can decode.

A plurality of pieces of audio format information in audio format list 121 stored in memory 120 will be described with reference to FIG. 3.

Figure 3:
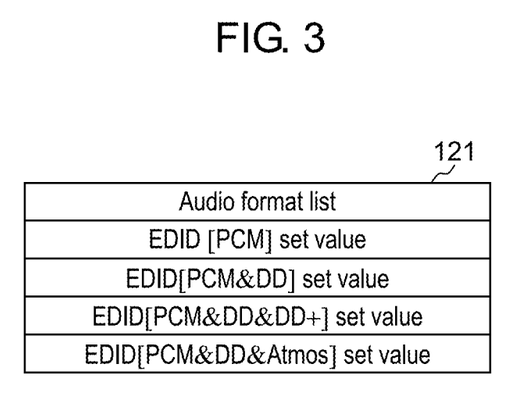
FIG. 3 is a view schematically illustrating an example of audio format information.

FIG. 3 is a view schematically illustrating an example of audio format information.

As shown in FIG. 3, audio format information includes EDID (EDID representing a set value of a pulse code modulation (PCM) audio format), EDID representing a set value of a PCM & Dolby Digital (DD) (registered trademark) audio format, EDID representing a set value of a PCM & DD & DD+ audio format, and EDID representing a set value of a PCM & DD & Atmos (Dolby Atmos (registered trademark)) audio format, which are information representing audio formats that sink device 100 can process. Note that the above described audio format information is an example of audio format information stored in memory 120, and the present disclosure is not limited to the above described audio format information.

In this exemplary embodiment, EDID stored as audio format information in memory 120 is information representing an audio format. A set value of EDID includes a number of audio output channels, a sampling frequency, a number of quantization bits, and the like (not shown).

With reference back to FIG. 2, the description will be continued.

Display device 160 displays a screen from which a user is able to select one piece of corresponding information from among a plurality of pieces of corresponding information respectively corresponding to the plurality of pieces of audio format information stored in memory 120. An example of this display screen will be described later. A plurality of pieces of corresponding information refers to, for example, a plurality of options, in other words, a pull-down menu, a selection menu, and the like from which a user is able to make a selection from the options. Display device 160 can be achieved by, for example, a processor, a memory stored with a program, a display, and the like. A display may be, for example, a liquid crystal display, or an organic Electro Luminescence (EL) display, and the like.

Receptor 180 accepts an input (user input) representing that a user has selected one piece of corresponding information from among a plurality of pieces of corresponding information displayed on display device 160. Receptor 180 can be achieved by, for example, a light receiving module capable of receiving an input signal based on an infrared signal sent from a remote control device (hereinafter abbreviated as a "remote controller," not shown).

Figure 4:
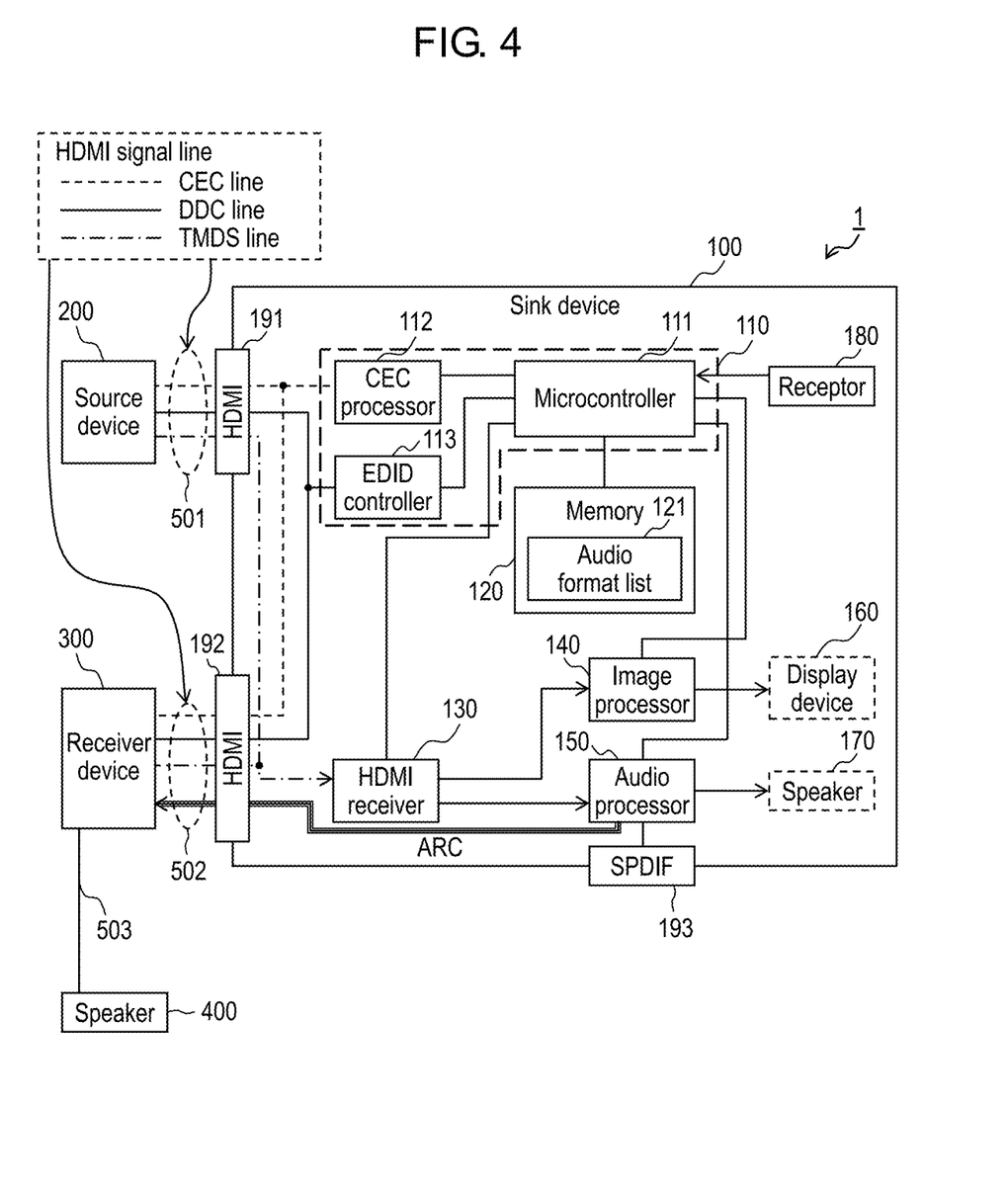
FIG. 4 is a block diagram schematically illustrating an exemplary configuration of a sink device according to the first exemplary embodiment.

FIG. 4 is a block diagram schematically illustrating an exemplary configuration of sink device 100 according to the first exemplary embodiment.

As shown in FIG. 4, sink device 100 includes microcontroller 111, CEC processor 112, EDID controller 113, memory 120, HDMI receiver 130, image processor 140, audio processor 150, display device 160, speaker 170, receptor 180, HDMI terminals 191, 192, and Sony Philips Digital InterFace (SPDIF) terminal 193.

Microcontroller 111 is a processor for controlling, in accordance with a control signal received by HDMI receiver 130 or receptor 180, CEC processor 112, EDID controller 113, memory 120, HDMI receiver 130, image processor 140, and audio processor 150. Microcontroller 111 is bi-directionally communicably connected, via control lines, to CEC processor 112, EDID controller 113, memory 120, HDMI receiver 130, image processor 140, and audio processor 150. Microcontroller 111 is also connected, via a control line, to receptor 180, and thus can receive control signals sent from HDMI receiver 130 and receptor 180.

In the exemplary configuration shown in FIG. 4, source device 200 is connected, via HDMI cable 501, to HDMI terminal 191, and receiver device 300 is connected, via HDMI cable 502, to HDMI terminal 192. HDMI signal lines of HDMI cables 501, 502 each include, as indicated within an area enclosed by broken lines shown in FIG. 4, CEC lines, Display Data Channel (DDC) lines, and Transition Minimized Differential Signaling (TMDS) lines. HDMI terminal 192 accepts Audio Return Channel (ARC).

CEC processor 112 performs bi-directional communication with source device 200 connected to HDMI terminal 191 or receiver device 300 connected to HDMI terminal 192. CEC processor 112 receives from source device 200 or receiver device 300 a CEC command, i.e., a control command, analyzes the received CEC command, and sends a result of analysis to microcontroller 111. CEC processor 112 can therefore allow microcontroller 111 to execute a process corresponding to the received CEC command. CEC processor 112 is connected, via the CEC lines of the HDMI signal lines, as indicated by broken lines shown in FIG. 4, to source device 200 connected to HDMI terminal 191 and receiver device 300 connected to HDMI terminal 192. CEC processor 112 can be achieved by, for example, a processor, a memory, and the like.

EDID controller 113 performs bi-directional communication with source device 200 connected to HDMI terminal 191 or receiver device 300 connected to HDMI terminal 192. EDID controller 113 obtains EDID of source device 200 or EDID of receiver device 300, and sends EDID of sink device 100 to source device 200 or receiver device 300. EDID controller 113 stores in a memory (EDID ROM (Read Only Memory)) (not shown) a set value of EDID represented by one piece of audio format information selected by microcontroller 111 from audio format list 121 stored in memory 120. EDID controller 113 then sends, when a request for obtaining EDID of sink device 100 (a request of acquisition by source device 200 from sink device 100) is received from source device 200, the set value of EDID stored in the EDID ROM to source device 200. At this time, the EDID ROM is an example of the second memory. EDID controller 113 is connected, via the DDC lines of the HDMI signal line, as indicated by solid lines shown in FIG. 4, to source device 200 connected to HDMI terminal 191 and receiver device 300 connected to HDMI terminal 192, respectively. EDID controller 113 is achieved by, for example, a processor, a memory, and the like. In sink device 100, an EDID ROM may be provided separately from memory 120, or a part of memory 120 may operate as an EDID ROM. When a part of memory 120 is an EDID ROM, memory 120 is an example of the second memory.

Controller 110 described in FIG. 2 is configured to include microcontroller 111, CEC processor 112, and EDID controller 113.

Memory 120 is communicably connected to microcontroller 111.

HDMI receiver 130 receives, via uni-directional communication, an image signal, an audio signal, a control signal for decoding the image signal and the audio signal, and the like sent from source device 200 connected to HDMI terminal 191 or receiver device 300 connected to HDMI terminal 192. HDMI receiver 130 is connected, via the TMDS lines of the HDMI signal lines, as indicated by alternate long and short dash lines shown in FIG. 4, to source device 200 connected to HDMI terminal 191 and receiver device 300 connected to HDMI terminal 192, respectively. HDMI receiver 130 outputs a received image signal to image processor 140, a received audio signal to audio processor 150, and a received control signal to microcontroller 111. HDMI receiver 130 can also output a received audio signal to HDMI terminal 192 that accepts the ARC. Note that an audio signal to be output using the ARC may be not only an audio signal that HDMI receiver 130 receives from source device 200, but also an audio signal that sink device 100 generates. As long as receiver device 300 conforms to the ARC, receiver device 300 can receive via HDMI terminal 192 an audio signal sent from source device 200.

Image processor 140 is a processor for decoding an image signal received from HDMI receiver 130, and for outputting on display device 160 an image as a result of decoding.

Audio processor 150 is a processor for decoding an audio signal received from HDMI receiver 130, and for outputting through speaker 170 audio as a result of decoding. Audio processor 150 can also output an audio signal extracted from a broadcasting signal received by a tuner (not shown) in a PCM audio format to HDMI terminal 192 accepting the ARC, as well as output an audio signal received from HDMI receiver 130 to HDMI terminal 192, using the ARC, without performing decoding, but in an original format.

FIG. 4 shows the exemplary configuration in which an audio signal is directly output from audio processor 150 to HDMI terminal 192. However, this exemplary embodiment is not limited to this configuration. An audio signal may be output from audio processor 150, via HDMI receiver 130, to HDMI terminal 192. In other words, a configuration may be applied, where HDMI receiver 130 outputs an audio signal received from audio processor 150 to HDMI terminal 192 as is. In the exemplary configuration shown in FIG. 4, a destination to which HDMI receiver 130 performs an output is audio processor 150. However, a destination to which HDMI receiver 130 performs an output may be HDMI terminal 192. In this case, in order to prevent an output of HDMI receiver 130 and an output of audio processor 150 from simultaneously being entered into HDMI terminal 192, a switch may be provided so that either of an output of HDMI receiver 130 and an output of audio processor 150 is selected and entered to HDMI terminal 192. Image processor 140 and audio processor 150 may each be achieved by an integrated circuit (hardware), or a processor, a memory, and the like (software).

Display device 160 is a display for displaying an image output from image processor 140.

Speaker 170 outputs audio output from audio processor 150.

Note that memory 120, display device 160, and receptor 180 have been described in detail with reference to FIG. 2, and thus will be omitted in here.

HDMI terminal 191 is connected, via HDMI cable 501, to source device 200, while HDMI terminal 192 is connected, via HDMI cable 502, to receiver device 300. HDMI terminals 191, 192 are interfaces into which image signals and audio signals output from source device 200 and receiver device 300 are entered. HDMI terminals 191, 192 are also bi-directionally communicable interfaces through which information such as a control signal, a CEC command, and EDID is transmitted between source device 200 and receiver device 300.

SPDIF terminal 193 is an interface for outputting a digital-format audio signal, and is achieved by, for example, an optical digital audio terminal, a coaxial digital audio terminal, and the like. SPDIF terminal 193 can output audio signals in various audio formats such as a PCM audio format and a DD audio format.

[1-2. Operation]

An operation of sink device 100 configured as described above will be described below.

Sink device 100 performs control to allow source device 200 to obtain EDID selected beforehand. The operation of sink device 100 will be described below with reference to FIG. 5.

Figure 5:
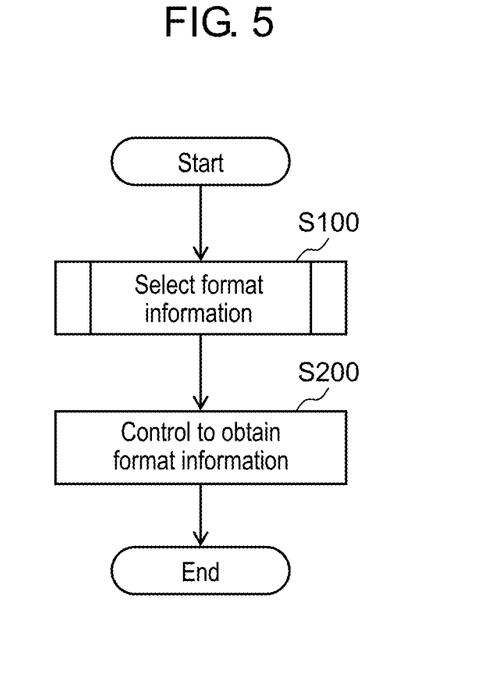
FIG. 5 is a flowchart illustrating an exemplary operation of the sink device according to the first exemplary embodiment.

FIG. 5 is a flowchart illustrating an exemplary operation of sink device 100 according to the first exemplary embodiment.

First, controller 110 selects, based on receiver format information, one piece of audio format information corresponding to the receiver format information from among a plurality of pieces of audio format information stored in memory 120 (step S100). Step S100 will be described later in detail. Note that receiver format information refers to information representing an audio format that receiver device 300 connected to sink device 100 can process.

Next, controller 110 allows source device 200 to obtain the audio format information selected in step S100 (step S200). Specifically, controller 110 performs control so that, when a request for sending audio format information representing an audio format with which source device 200 should perform an output (a request of transmission from sink device 100 to source device 200) is received from source device 200, audio format information stored in the EDID ROM is sent to source device 200. Sink device 100 can therefore allow source device 200 to obtain appropriate audio format information.

Next, a selection process performed in step S100 will be described in detail with reference to FIG. 6.

Figure 6:
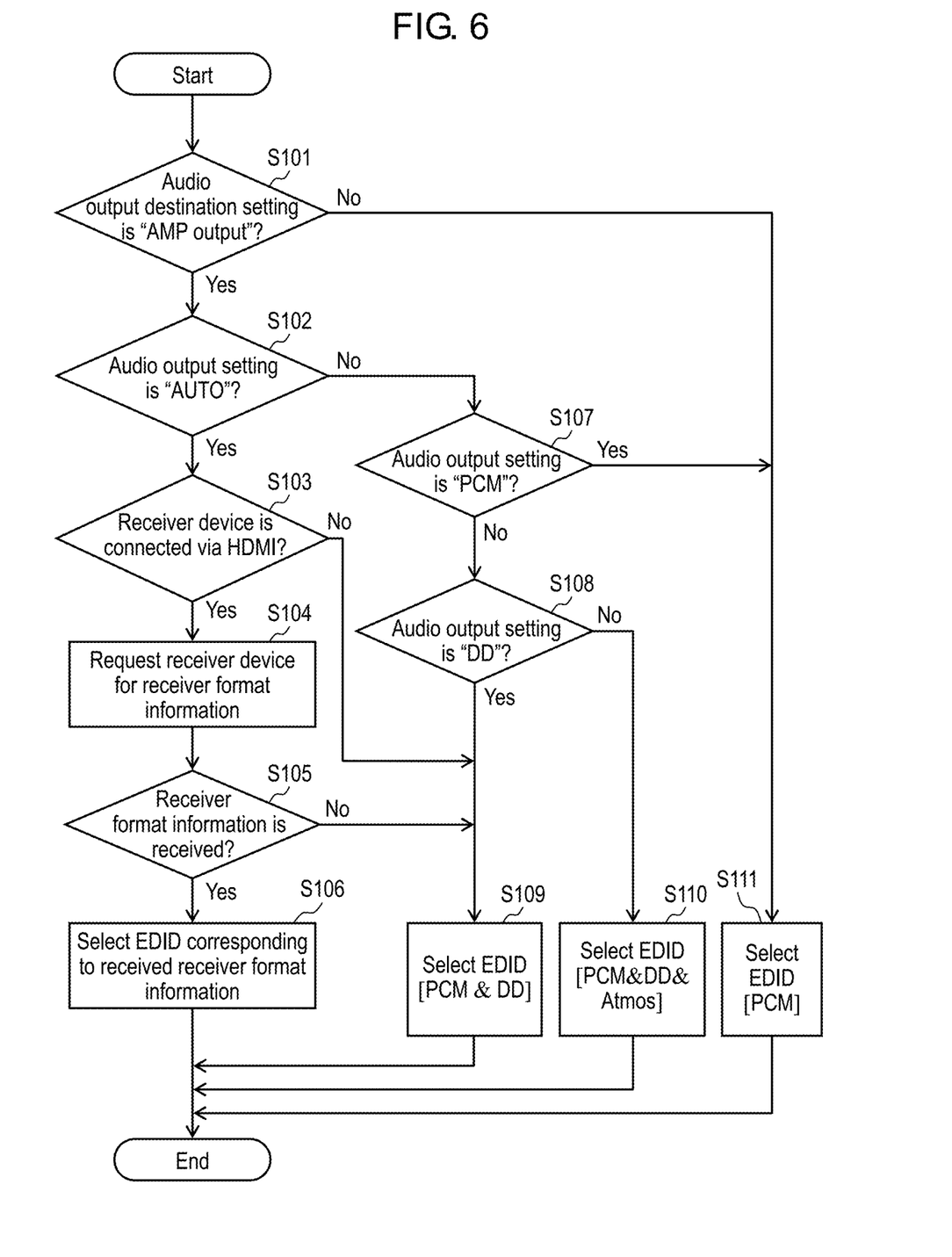
FIG. 6 is a flowchart illustrating an exemplary operation of a selection process executed by the sink device according to the first exemplary embodiment.

FIG. 6 is a flowchart illustrating an exemplary operation of a selection process executed by sink device 100 according to the first exemplary embodiment.

First, controller 110 determines whether or not an audio output destination setting set beforehand in sink device 100 is "AMP output" (step S101).

Note that a term "AMP output" represents that an audio output destination of sink device 100 is set to receiver device 300.

When controller 110 has determined that, in step S101, the audio output destination setting set beforehand in sink device 100 is "AMP output" (Yes in step S101), controller 110 determines whether or not an audio output setting set beforehand in sink device 100 is "AUTO" (step S102).

A term "AUTO" represents that controller 110 automatically selects an audio format that receiver device 300 can process, regardless of whether or not a user gives an instruction, and then controller 110 outputs an audio signal in the selected audio format.

When controller 110 has determined that, in step S102, the audio output setting set beforehand in sink device 100 is "AUTO" (Yes in step S102), controller 110 determines whether or not receiver device 300 is connected, via HDMI cable 501 or HDMI cable 502, to HDMI terminal 191 or HDMI terminal 192 (step S103).

When controller 110 has determined that, in step S103, for example, receiver device 300 is connected, via HDMI cable 502, to HDMI terminal 192 (Yes in step S103), controller 110 requests receiver device 300, with a CEC command, for receiver format information (step S104). Receiver format information refers to information representing an audio format that receiver device 300 can process.

Controller 110 determines whether or not receiver format information requested in step S104 is received from receiver device 300 (step S105).

When controller 110 has determined that, in step S105, receiver format information is received from receiver device 300 (Yes in step S105), controller 110 selects EDID corresponding to the received receiver format information from among the plurality of pieces of audio format information (EDID) stored in memory 120 (step S106). This operation refers to a first selection.

When controller 110 has determined that, in step S102, the audio output setting set beforehand in sink device 100 is not "AUTO" (No in step S102), controller 110 operates so as to select EDID set beforehand by a user. This operation refers to a second selection. The second selection will be described later in detail. When controller 110 has determined No in step S102, controller 110 determines whether or not an audio output setting in accordance with a user setting is "PCM" (step S107).

When controller 110 has determined that, in step S107, the audio output setting in accordance with the user setting is not "PCM" (No in step S107), controller 110 determines whether or not the audio output setting in accordance with the user setting is "DD" (step S108).

When controller 110 has determined that, in step S108, the audio output setting in accordance with the user setting is "DD" (Yes in step S108), the process proceeds to step S109. When controller 110 has determined that, in step S103, receiver device 300 is connected to neither of HDMI terminals 191, 192 (No in step S103), and controller 110 has determined that, in step S105, receiver format information is not received from receiver device 300 (No in step S105), the process also proceeds to step S109.

Controller 110 selects EDID representing a PCM & DD audio format from among the plurality of pieces of audio format information (EDID) stored in memory 120 (step S109).

When controller 110 has determined that, in step S108, the audio output setting in accordance with the user setting is not "DD" (No in step S108), controller 110 selects EDID representing a PCM & DD & Atmos audio format from among the plurality of pieces of audio format information (EDID) stored in memory 120 (step S110).

When controller 110 has determined that, in step S107, the audio output setting in accordance with the user setting is "PCM" (Yes in step S107), the process proceeds to step S111. When controller 110 has determined that, in step S101, the audio output destination setting set beforehand in sink device 100 is not "AMP output" (No in step S101), the process also proceeds to step S111.

Controller 110 selects EDID representing a PCM audio format from among the plurality of pieces of audio format information (EDID) stored in memory 120 (step S111).

As described above, controller 110 executes a selection process for selecting one piece of audio format information (EDID) from among the plurality of pieces of audio format information (EDID) stored in memory 120.

Controller 110 stores the audio format information (EDID) selected in step S106, step S109, step S110, or step S111 in the EDID ROM (not shown). Controller 110 then sends, as described above, in step S200, the audio format information (EDID) stored in the EDID ROM to source device 200. As described above, sink device 100 can allow source device 200 to obtain appropriate audio format information (EDID).

As described with reference to the flowchart shown in FIG. 6, when controller 110 has determined that, in step S102, the audio output setting is not "AUTO" (No in step S102), controller 110 selects EDID set beforehand by the user. A UI screen displayed on display device 160 of sink device 100, from which a user is able to select an audio format, will be described with reference to FIG. 7.

Figure 7:
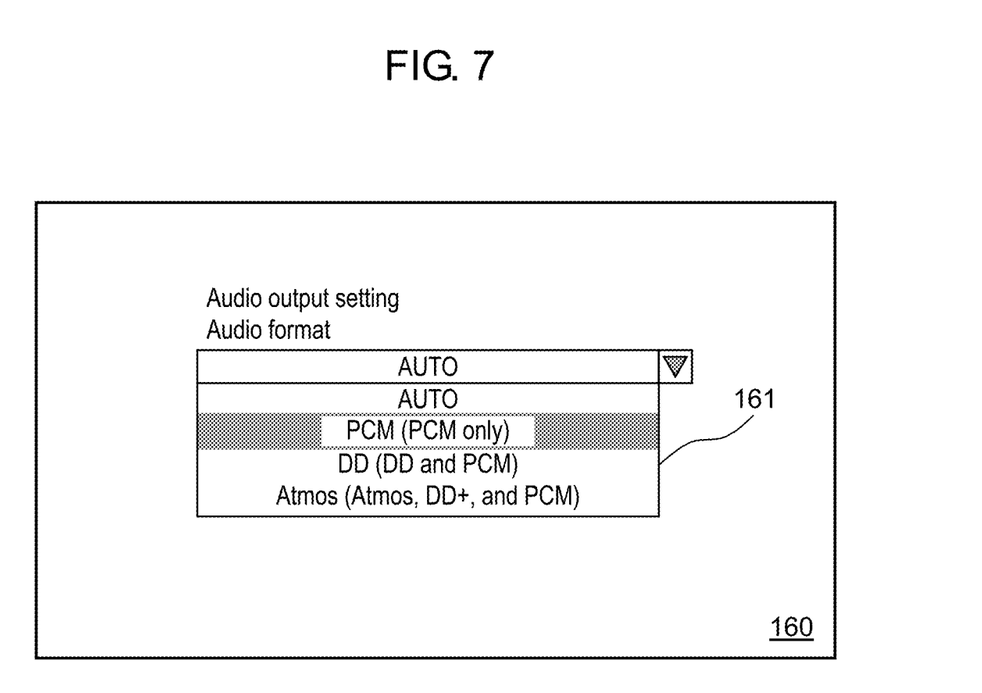
FIG. 7 is a view schematically illustrating an example of a User Interface (UI) screen displayed on the sink device according to the first exemplary embodiment.

FIG. 7 is a view illustrating an example of a User Interface (UI) screen displayed on sink device 100 according to the first exemplary embodiment.

Sink device 100 can display on display device 160, when a user has performed a predetermined operation using an input device such as a remote controller, UI screen 161 from which the user is able to perform an audio output setting as illustrated in FIG. 7.

In this exemplary embodiment, UI screen 161 is a screen configured to allow a user to select a desired one from among a plurality of predetermined audio formats that is pulled down.

Receptor 180 accepts, by way that a user operates, for example, a cross-shape key on the remote controller, an operation for selecting a desired one from among a plurality of options (corresponding information) that is pulled down respectively corresponding to the plurality of audio formats. Receptor 180 then accepts, by way that the user has pressed, for example, an enter key on the remote controller, an operation for determining the option selected by the user. Information regarding an audio format, which is determined as described above, is output from receptor 180 to controller 110.

In this manner, in sink device 100, the audio output setting is set to the audio format selected by the user. For example, in the example shown in FIG. 7, the user is able to select any of settings of "AUTO," "PCM (PCM only)," "DD (DD and PCM)," and "Atmos (Atmos, DD+, and PCM)." Note that the options shown in FIG. 7 are merely an example, and options of the present disclosure are not limited to these options.

Note that the flowchart shown in FIG. 6 has been created based on UI screen 161 shown in FIG. 7. If options displayed on UI screen 161 from which a user is able to make a selection differ from the above described options, the flowchart shown in FIG. 6 may be altered in accordance with the options.

Note that in sink device 100, for example, the PCM audio format may be set as an initial (default) setting for the audio output setting before a user performs a setting.

[1-3. Effects and the Like]

As described above, in this exemplary embodiment, the sink device is a sink device bi-directionally communicably connected to a source device. The sink device includes a first memory, and a controller. Stored in the first memory is a plurality of pieces of audio format information including information representing an audio format that the sink device can process. The controller selects, from among the plurality of pieces of audio format information stored in the first memory, one piece of audio format information corresponding to receiver format information representing an audio format that a receiver device connected to the sink device can process. The controller then outputs the selected audio format information to the source device.

Note that sink device 100 is an example of the sink device. Source device 200 is an example of the source device. Memory 120 is an example of the first memory. Controller 110 is an example of the controller. Receiver device 300 is an example of the receiver device. Audio format list 121 is an example of the plurality of pieces of audio format information stored in the first memory, and the plurality of pieces of audio format information displayed on UI screen 161 is an example of the plurality of pieces of audio format information stored in the first memory.

For example, in the exemplary configuration according to the first exemplary embodiment, sink device 100 is bi-directionally communicably connected to source device 200, and includes memory 120, and controller 110. Stored in memory 120 is a plurality of pieces of audio format information including information representing an audio format that sink device 100 can process. Controller 110 selects, from among the plurality of pieces of audio format information stored in memory 120, one piece of audio format information based on receiver format information representing an audio format that receiver device 300 connected to sink device 100 can process. Controller 110 then outputs the selected audio format information to source device 200, and allows source device 200 to obtain the selected audio format information.

For example, it is assumed that receiver device 300 is a receiver device without having a function for, when a request for sending an audio format information that receiver device 300 is supporting (a request of transmission from receiver device 300 to sink device 100) is received from sink device 100, sending audio format information in accordance with the request to sink device 100 (hereinafter referred to as a "non-supported device"). In such a case, sink device 100 has difficulty in obtaining appropriate audio format information from receiver device 300. With a conventional technology, in such a case, a sink device has difficulty in allowing a source device to obtain appropriate audio format information. However, sink device 100 according to this exemplary embodiment can allow source device 200 to obtain audio format information selected based on receiver format information from among a plurality of pieces of audio format information stored in memory 120. Source device 200 can therefore send an audio signal to sink device 100 in an audio format in accordance with the audio format information obtained from sink device 100. When receiver device 300 is also connected via, instead of a bi-directionally communicably HDMI cable, SPDIF 193 capable of performing uni-directional communication only, to sink device 100, sink device 100 has difficulty in obtaining appropriate audio format information from receiver device 300. However, even in such a case, sink device 100 can allow source device 200 to obtain audio format information selected based on receiver format information from among a plurality of pieces of audio format information stored in memory 120. Sink device 100 can therefore allow source device 200 to obtain appropriate audio format information.

The controller included in the sink device may request the receiver device to send the receiver format information. When the controller has obtained receiver format information from the receiver device, the controller may perform a first selection for selecting audio format information corresponding to the obtained receiver format information from among the plurality of pieces of audio format information stored in the first memory.

For example, in the exemplary configuration according to the first exemplary embodiment, controller 110 requests receiver device 300 to send the receiver format information. When controller 110 has obtained receiver format information sent from receiver device 300, controller 110 performs a first selection for selecting audio format information corresponding to the obtained receiver format information from among the plurality of pieces of audio format information stored in memory 120.

For example, it is assumed that receiver device 300 is a receiver device having a function for, when a request for sending an audio format information that receiver device 300 is supporting (a request of transmission from receiver device 300 to sink device 100) is received from sink device 100, sending audio format information in accordance with the request to sink device 100 (hereinafter referred to as a "supported device"). In such a case, controller 110 can select audio format information corresponding to the obtained receiver format information. Sink device 100 can therefore allow source device 200 to obtain appropriate audio format information based on the receiver format information obtained from receiver device 300.

The sink device may further include a display device, and a receptor. The display device may display a screen from which a user is able to select one piece of corresponding information from among a plurality of pieces of corresponding information respectively corresponding to the plurality of pieces of audio format information stored in the first memory. The receptor may accept an input representing that one piece of corresponding information is selected from among the plurality of pieces of corresponding information displayed on the display device. The controller may perform a second selection for selecting audio format information corresponding to one piece of corresponding information represented by the input from among the plurality of pieces of audio format information stored in the first memory.

The controller may otherwise perform a second selection if receiver format information is not obtained from the receiver device.

Note that display device 160 is an example of the display device. Receptor 180 is an example of the receptor. UI screen 161 is an example of the screen displayed on the display device, from which a user is able to select corresponding information.

For example, in the exemplary configuration according to the first exemplary embodiment, sink device 100 further includes display device 160, and receptor 180. Display device 160 displays UI screen 161 from which a user is able to select one piece of corresponding information from among a plurality of pieces of corresponding information respectively corresponding to the plurality of pieces of audio format information stored in memory 120. Receptor 180 accepts an input representing that one piece of corresponding information is selected from among the plurality of pieces of corresponding information displayed on display device 160. When controller 110 has not obtained receiver format information from receiver device 300, controller 110 then performs a second selection for selecting audio format information corresponding to one piece of corresponding information represented by the input accepted by receptor 180 from among the plurality of pieces of audio format information stored in memory 120.

Even when receiver device 300 is a non-supported device, or receiver device 300 is connected to sink device 100 via an interface that performs uni-directional communication only from sink device 100 to receiver device 300, and thus sink device 100 cannot obtain receiver format information from receiver device 300, sink device 100 can therefore allow source device 200 to obtain audio format information selected by the user from among the plurality of pieces of audio format information stored in memory 120.

The sink device may further include a second memory for storing the audio format information selected by the controller. When the controller has received, from the source device, a request for obtaining audio format information representing an audio format with which the source device should perform an output, the controller may allow the source device to obtain the audio format information stored in the second memory.

Note that memory 120 or the EDID ROM (not shown) is an example of the second memory.

For example, in the exemplary configuration according to the first exemplary embodiment, in sink device 100, controller 110 stores the audio format information selected by controller 110 in memory 120 or the EDID ROM. When controller 110 has received, from source device 200, a request for obtaining audio format information representing an audio format with which source device 200 should perform an output, controller 110 then reads the audio format information (EDID) stored in memory 120 or the EDID ROM, outputs the audio format information (EDID) to source device 200, and allows source device 200 to obtain the audio format information (EDID).

In this exemplary configuration, when source device 200 requests sink device 100 to obtain audio format information representing an audio format with which source device 200 should perform an output (a request of acquisition by source device 200 from sink device 100), controller 110 of sink device 100 reads audio format information stored in the EDID ROM and sends it to source device 200. Sink device 100 can therefore easily allow source device 200 to obtain audio format information selected by controller 110.

[1-4. Modification]

In the first exemplary embodiment, the exemplary operation has been described, where, when controller 110 has determined No in step S105 of the selection process, controller 110 executes step S109 to select EDID representing the PCM & DD audio format. However, an operation of the present disclosure is not limited to this operation. For example, when controller 110 has determined that, in step S105, receiver format information is not received from receiver device 300 (No in step S105), the process proceeds to step S107 and controller 110 may execute step S107 to perform an operation for selecting EDID selected beforehand by a user, in other words, to perform a second selection (not shown). A UI screen displayed on display device 160 of sink device 100 from which a user is able to select an audio format when controller 110 performs the operation as described above will be described with reference to FIG. 8.

Figure 8:
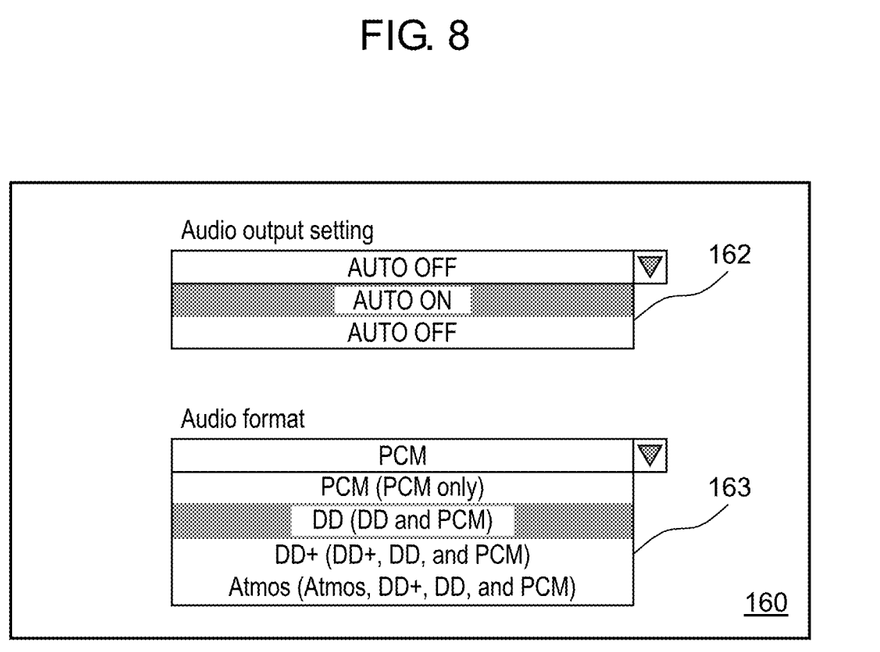
FIG. 8 is a view schematically illustrating an example of a User Interface (UI) screen displayed on a sink device according to a modification of the first exemplary embodiment.

FIG. 8 is a view schematically illustrating an example of a User Interface (UI) screen displayed on sink device 100 according to a modification of the first exemplary embodiment.

Sink device 100 may display on display device 160, when a user has performed a predetermined operation using an input device such as a remote controller, UI screens 162, 163 from which the user is able to perform an audio output setting as illustrated in FIG. 8.

In this modification, UI screen 162 is a screen configured to allow a user to select an audio output setting to "AUTO ON" (a setting to be determined as Yes in step S102) or "AUTO OFF" (a setting to be determined as No in step S102) that are pulled down. UI screen 163 is a screen configured to allow a user to select a desired one from among a plurality of predetermined audio formats that is pulled down.

Receptor 180 accepts, by way that a user operates, for example, a cross-shape key on the remote controller, an operation for selecting an audio output setting from options of "AUTO ON" and "AUTO OFF" that are pulled down, and for selecting a desired one from among a plurality of options (corresponding information) that is pulled down respectively corresponding to a plurality of audio formats. Receptor 180 then accepts, when the user has pressed, for example, an enter key on the remote controller, an operation for determining the option selected by the user. Information regarding an audio format, which is determined as described above, is output from receptor 180 to controller 110.

In this manner, in sink device 100 according to this modification, the audio output setting is set to the audio format selected by a user. For example, in the example shown in FIG. 8, the user is able to select, as an audio output setting, "AUTO ON" or "AUTO OFF," as well as select, as an audio format, any of "PCM (PCM only)," "DD (DD and PCM)," "DD+ (DD+, DD, and PCM)," and "Atmos (Atmos, DD+, DD, and PCM)." Note that UI screen 163 is an example of the screen displayed on the display device, from which a user is able to select corresponding information. The options shown in FIG. 8 are merely an example, and options of the present disclosure are not limited to these options.

In the first exemplary embodiment, the exemplary operation has been described, where controller 110 performs the processes of, in the selection process, steps S103 to S106 to determine whether or not receiver device 300 is supporting an HDMI CEC command, and, when controller 110 has determined that receiver device 300 is supporting the command, controller 110 selects EDID corresponding to receiver format information received from receiver device 300 from among the plurality of pieces of audio format information (EDID) stored in memory 120. However, an operation of the present disclosure is not limited to this operation. For example, controller 110 may not perform the processes of steps S103 to S106. That is, sink device 100 may perform control so that source device 200 is allowed to obtain EDID selected beforehand by a user.

Other Exemplary Embodiments

As described above, the first exemplary embodiment has been described and exemplified as the technology disclosed in this application. For the purpose of such exemplification, the accompanied drawings and detailed descriptions have been provided. However, the technology according to the present disclosure is not limited to the above described first exemplary embodiment and the modification, but is applicable to exemplary embodiments where alteration, replacement, addition, omission, and the like have been made. A new exemplary embodiment can also be made by combining components of the first exemplary embodiment described above.

Therefore, the components described in the accompanied drawings and the detailed descriptions may include not only components that are essential for solving the problems, but also components that are used for exemplifying the above described technology, and are thus not essential for solving the problems. Although the components that are not essential are described in the accompanied drawings and the detailed descriptions, it should not be construed immediately that these components that are not essential are essential components.

The above described exemplary embodiments are merely examples for illustrating the technology according to the present disclosure, and thus alteration, replacement, addition, omission, and the like can variously be made within the scope of the claims and their equivalents.

INDUSTRIAL APPLICABILITY

The present disclosure is applicable to sink devices and the like capable of allowing a source device to obtain appropriate audio format information. Specifically, the present disclosure is applicable to television receivers, or monitors and the like that have a speaker for audio output.

REFERENCE MARKS IN THE DRAWINGS

1: AV system
100: sink device
110: controller
111: microcontroller
112: CEC processor
113: EDID controller
120: memory
121: audio format list
130: HDMI receiver
140: image processor
150: audio processor
160: display device
161, 162, 163: UI screen
170: speaker
180: receptor
191, 192: HDMI terminal
193: SPDIF terminal
200: source device
300: receiver device
400: speaker
501, 502: HDMI cable
503: speaker cable

The invention claimed is:

1. A sink device bi-directionally communicably connected to a source device, the sink device comprising:
a first memory storing a plurality of pieces of audio format information including information representing an audio format that the sink device can process; and
a controller for selecting, based on a first selection or a second selection, from among the plurality of pieces of audio format information stored in the first memory, one piece of audio format information corresponding to receiver format information representing an audio format that a receiver device connected to the sink device can process, and for outputting the selected audio format information to the source device, wherein:
the controller determines whether or not an audio output destination set beforehand is the receiver device,
when the controller has determined that the audio output destination is not the receiver device, the controller performs the second selection, and
when the controller has determined that the audio output destination is the receiver device, the controller determines whether or not an audio output setting is a predetermined setting,
when the controller has determined that the audio output setting is the predetermined setting, the controller performs either the first selection or the second selection, and when the controller has determined that the audio output setting is not the predetermined setting, the controller performs the second selection.

2. The sink device according to claim 1, wherein: when the controller has determined the audio output setting is the predetermined setting, the controller
  requests the receiver device to send the receiver format information to the sink device, and,
  when the receiver format information is obtained from the receiver device, the controller performs the first selection, the first selection referring to an operation for selecting, from among the plurality of pieces of audio format information, audio format information corresponding to the obtained receiver format information.

3. The sink device according to claim 2, further comprising:
  a display device for displaying a screen, from which a user is able to select one piece of corresponding information from among a plurality of pieces of corresponding information respectively corresponding to the plurality of pieces of audio format information; and
  a receptor for accepting an input representing that one piece of corresponding information is selected from among the plurality of pieces of corresponding information displayed on the display device,
  wherein the controller performs, when the receiver format information is not obtained from the receiver device, the second selection, the second selection referring to an operation for selecting, from among the plurality of pieces of audio format information, audio format information corresponding to one piece of corresponding information represented by the input.

4. The sink device according to claim 1, further comprising:
  a display device for displaying a screen, from which a user is able to select one piece of corresponding information from among a plurality of pieces of corresponding information respectively corresponding to the plurality of pieces of audio format information, and
  a receptor for accepting an input representing that one piece of corresponding information is selected from among the plurality of pieces of corresponding information displayed on the display device,
  wherein, when the controller has determined the audio output setting is not the predetermined setting, the controller performs the second selection, the second selection referring to an operation for selecting, from among the plurality of pieces of audio format information, audio format information corresponding to one piece of corresponding information represented by the input.

5. The sink device according to claim 1, further comprising a second memory storing the audio format information selected by the controller,
  wherein the controller outputs, when a request for obtaining audio format information representing an audio format with which the source device should perform an output is received from the source device, the audio format information stored in the second memory to the source device.

* * * * *